United States Patent [19]

Parsons et al.

[11] 4,299,314
[45] Nov. 10, 1981

[54] CLUTCH BRAKE MECHANISMS

[75] Inventors: David Parsons, Kenilworth; Maurice Taylor, Leamington Spa; Alastair J. Young, Kenilworth, all of England

[73] Assignee: Automotive Products Limited, Leamington Spa, England

[21] Appl. No.: 68,538

[22] Filed: Aug. 22, 1979

[30] Foreign Application Priority Data

Sep. 8, 1978 [GB] United Kingdom ............... 36195/78

[51] Int. Cl.³ .......................................... B60K 41/24
[52] U.S. Cl. .................... 192/12 C; 60/581; 60/591
[58] Field of Search .................. 60/561, 581, 591; 91/513, 517, 518, 532; 192/12 C

[56] References Cited

U.S. PATENT DOCUMENTS

| | | | |
|---|---|---|---|
| 2,770,948 | 11/1956 | Porter | 60/591 |
| 3,163,473 | 12/1964 | Stelzer | 60/591 |
| 3,486,337 | 12/1969 | Tenniswood | 60/561 |
| 3,489,257 | 1/1970 | Akio Nakano | 60/591 |
| 3,915,260 | 10/1975 | Kim | 192/12 C |
| 4,139,988 | 2/1979 | Adachi | 91/532 |
| 4,175,392 | 11/1979 | Morimoto | 60/561 |

Primary Examiner—Abraham Hershkovitz
Attorney, Agent, or Firm—Kemon & Estabrook

[57] ABSTRACT

A master cylinder and brake valve assembly for operating the clutch and clutch brake of a heavy road vehicle is arranged such that up to a first given displacement of the master cylinder piston the clutch release mechanism only is connected to the master cylinder and, above a second further given displacement of the piston, the brake actuator only is connected to the master cylinder, there being a step change in thrust applied to the piston between the given displacements.

In a modification, above a third further given displacement of the piston, the brake actuator is reisolated from the master cylinder.

9 Claims, 3 Drawing Figures

CLUTCH BRAKE MECHANISMS

This invention relates to a fluid pressure operated clutch release mechanism which is capable of actuating a clutch driven shaft brake whilst the clutch is disengaged.

Clutch brakes are frequently fitted to heavy road vehicles to speed gear changing from a lower gear to a higher gear. Such gear changes would otherwise be protracted because the high rotating inertia of the vehicle gear set prolongs the delay of gearbox input shaft speed to one which closely matches engine speed. Clutch brakes prolong clutch and gearbox life by reducing driver abuse which might otherwise occur due to rapid gear changes.

Known clutch brakes are actuated by the clutch release mechanism mounted on the clutch cover assembly. Such arrangements are complicated and space consuming, further, they are sensitive to wear of the clutch drive plate facings and frequently require an integral wear adjuster to ensure that the clutch brake is not applied until the clutch driven plate is fully released. The wear adjuster increases the complication of the release mechanism.

It is an object of the present invention to overcome the aforementioned disadvantage by providing an improved clutch brake mechanism which separates the clutch release operation from the brake actuation and so reduces the need for compensation due to clutch driven plate wear.

According to the invention there is provided a hydraulic master cylinder and brake valve assembly having means to pass fluid under pressure sequentially to a release mechanism for a friction clutch and to an actuator for a friction brake for a drive member driven through the friction clutch, characterised thereby that means are provided such that up to a first given displacement of the master cylinder piston the clutch release mechanism only is connected to the master cylinder and, above a second given displacement of the master cylinder piston the brake actuator only is connected to the master cylinder, movement of the master cylinder piston between said first and second given displacements requiring a step change in thrust applied to said piston.

Preferably the master cylinder includes a co-axial outlet port for connection to the clutch release mechanism, the master cylinder piston having a co-axial lost motion device and closure member for co-operation with said outlet port so that, in use, at said first displacement the closure member closes said outlet port to isolate the clutch release mechanism.

The brake valve may include a valve member having piston areas respectively to be exposed to fluid pressure in the master cylinder and in the clutch release mechanism such that at the second given displacement said valve member moves to place the master cylinder in communication with the brake actuator.

Preferably at a third further given displacement, said valve member moves to isolate the brake actuator from the master cylinder.

Other features of the invention are included in the following description of a hydraulic master cylinder and brake valve arrangement, shown, by way of example, on the accompanying drawings, in which.

Figure 1:
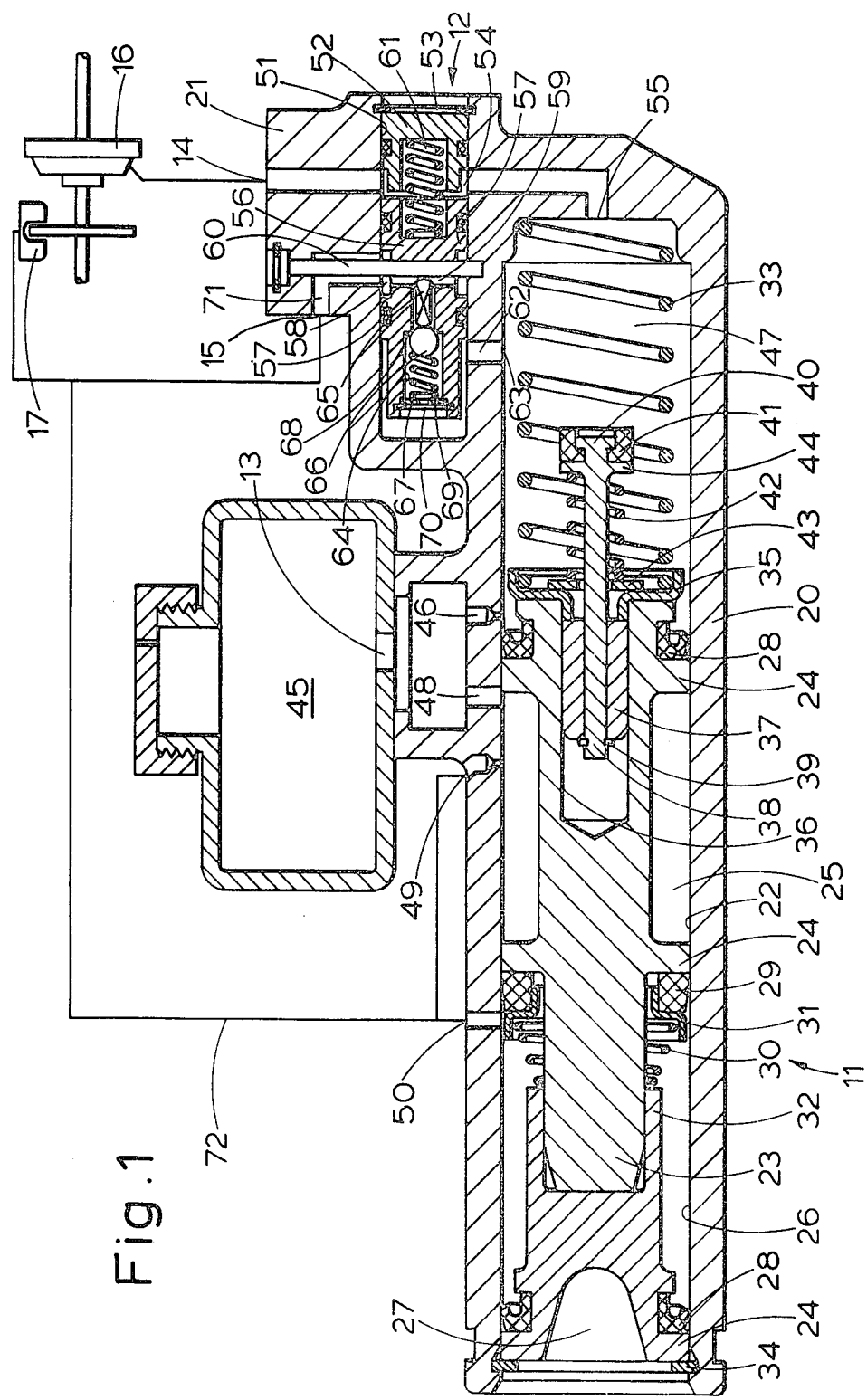
FIG. 1 is a transverse section through a master cylinder and brake valve according to one aspect of the invention.

In FIG. 1 is shown a hydraulic master cylinder 11 in unit with a brake valve 12, having a feed port 13 from a fluid reservoir 45 to the master cylinder 11 and outlet ports 14 and 15 from the brake valve 12 respectively to a hydraulically operable clutch 16 and a hydraulically operable driven shaft brake 17. The brake may conveniently be a disc brake.

The master cylinder body 20 has a blind bore 22 with a spool 23 axially reciprocal therein. The spool 23 has three lands 24, defining a pair of annular chambers 25 and 26 therebetween, and consists of two parts sleeved together, as shown, intermediate the outer and centre spool lands. The spool 23 has an axial recess 27 adjacent the open end of the bore 22 for co-operation with the thrust rod of a clutch pedal, (not shown).

The outer and inner lands of the spool 23 provide support surfaces for fluid seals 28, and a third fluid seal 29 is located against the centre land of the spool 23 by a frusto-conical compression spring 30 acting between a generally 'Z' section ring 31 backing the seal 29 and a step 32 formed on the spool 23 between the centre and outer lands 24.

A coiled compression spring 33 biases the spool 23 against a circlip 34 located at the open end of the bore 22, the spring 33 acting between the blind end of the bore 22 and a generally 'Z' section retainer 35 located in a blind bore 36 in the spool 23, as shown.

A support sleeve 37, axially reciprocal within the spool bore 36 is trapped by the retainer 35.

A rod 38, slidable in the sleeve 37, is restrained by a circlip 39 fitted to the rod end adjacent the blind end of the spool bore 36, and has a head 40 at the rod end remote from the circlip 39 which carries a fluid seal 41. A coiled compression spring 42, co-axial with the rod 38, acts between a washer 43 abutting the retainer 35 and a larger diameter rod portion 44, which also provides a support surface for the seal 41, to urge the rod 38 and sleeve 37 out of the spool bore 36.

A hydraulic fluid reservoir 45 is conveniently mounted on the master cylinder body 21 and, with the spool 23 in the inactive position as shown, has an inlet port 46 opening into the spring chamber 47 at the blind end of the bore 22, and a drain port 48 opening into the annular chamber 25 between the centre and inner spool lands. Port 48 is further connected through relief port 49 and vent 50 to fluid chamber 26.

The brake valve 12 has a blind bore 51 closed and sealed by a plug 52 and circlip 53. The plug 52 has a reduced diameter inner end portion and the annular space 54 so formed provides a permanent fluid connection between a fluid port 55 formed in the blind end of the spool bore 22 and the outlet port 14 connected to the hydraulic motor of the clutch 16, as shown.

The brake spool 56 sealingly reciprocal within the valve bore 51 has a pair of lands 57 defining therebetween an annular chamber 58 having a diametral fluid passage 59 formed through the spool 56.

A fixed cross-pin 60 located in the brake valve body 21 passes through the passage 59 and serves to limit movement of the brake spool 56 within the valve bore 51.

A coiled compression spring 61 biasses the brake spool 56 away from the plug 52 against the cross-pin 60, the spring being housed in cylindrical recesses formed in facing surfaces of the plug 52 and the brake spool 56.

The brake spool 56 has a reduced diameter portion, adjacent the blind end of the valve bore 51, into which opens a passage 62 from a port 63 situated part way along the spring chamber 47 of the master cylinder bore 22.

A double diameter axial bore 64 is formed in the brake spool 56 between the diametral passage 59 at the end of the brake spool 56 adjacent the blind end of the valve bore 51. The smaller diameter portion, adjacent the diametral passage 59 houses a fluted pin 65.

A ball 66 is urged by a coiled compression spring 67 onto a seat 68 formed by the step in the brake spool bore 64, the spring 67 reacting against a washer 69 retained in the bore 64 by a circlip 70.

The diametral drilling 59 communicates through a passage 71 with the outlet port 15 and hence the hydraulic motor of the clutch driven shaft brake 17, a passage 72 also being provided to link the outlet port 15 with the relief port 49 and hence the fluid reservoir 45.

The operation of this embodiment is as follows:

In the unactivated position, as shown, both the clutch 16 and clutch brake 17 are connected to the reservoir 45 through inlet port 46 and drain port 48 respectively.

Actuation of the vehicle clutch pedal, (not shown), moves the spool 23 into the master cylinder bore 22, the inner fluid seal 28 passes the inlet port 46 from the reservoir 45 and the hydraulic fluid in the spring chamber 47 is thus pressurised.

Brake spool 56, under the influence of spring 61 is abutting cross-pin 60 and ball 66 is seated on step 68 by spring 67.

Pressurised fluid passes through the port 55, chamber 54 and outlet port 14 to the clutch 16 which is disengaged in the normal manner. Pressurised fluid also passes through passage 62 and acts on the inner end of brake spool 56 but is opposed by the equal pressure in chamber 54 acting on the outer end of brake spool 56, the ball 66 remains seated.

As the spool 23 moves inward in the bore 22 the pressure of fluid in spring chamber 47 increases until, as the fluid seal 41 on the rod 38 is about to cover the port 55, the clutch is fully disengaged.

Further inward movement of the spool 23 causes the fluid seal 41 to cover the port 55 so isolating the, now disengaged, clutch 16 from the spring chamber 47. As the port 55 is closed the fluid seal 29 isolates the relief port 49 from the drain port 48 and hence the clutch brake 17 from the reservoir 45.

Increasing fluid pressure in the spring chamber 47 now acts through passage 62 against the inner end of the brake spool 56 to move it against the pre-load of the spring 61. The pin 65 and cross-pin 60 co-operate to lift the ball 66 from its seat 68 and pressurised fluid passes past the ball 66, through the flutes on the pin 65 and through the passages 59 and 71 to the outlet port 15 and thence the clutch brake 17. The clutch brake motor is actuated to slow down the clutch driven shaft.

Removal of the thrust on the master cylinder spool 23 causes it to move outward in the bore 22 under the action of the spring 33.

Initially, seal 29 uncovers relief port 49 and the clutch brake motor exhausts through fluid passage 72, port 49 and drain port 48. As the pressure in fluid passage 71 decays the brake spool 56 moves to re-seat the ball 66.

Further outward travel of the master cylinder spool 23 causes seal 41 to lift off port 55 and allow the clutch motor to vent into spring chamber 47. Thus the clutch progressively re-engages over the remaining stroke of the spool 23 until the seal 28 passes the port 46.

Figure 2:
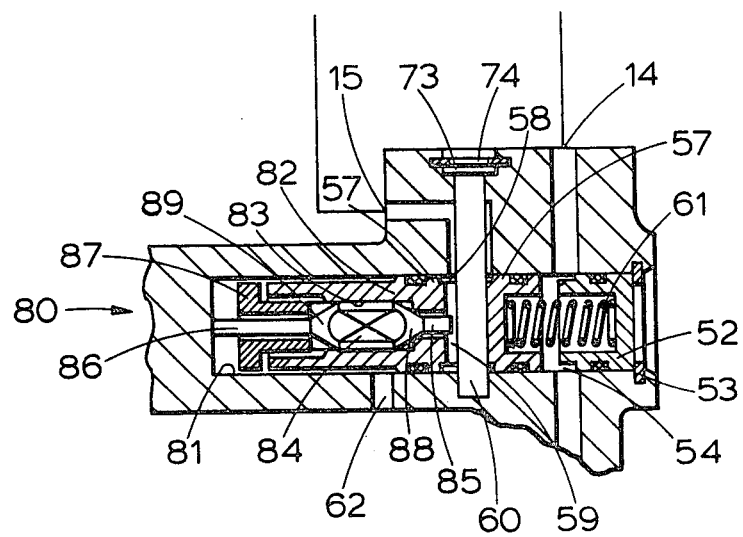
FIG. 2 is a transverse section through an alternative brake valve for use with the master cylinder shown in FIG. 1.

In the alternative arrangement, shown in FIG. 2 the brake valve limits the maximum hydraulic pressure in the clutch driven shaft brake. This brake valve is used in conjunction with the previously described master cylinder and common features are annotated with the same reference numerals.

The brake valve 80 has a spool 82 retained and sealed in the valve bore 81 by the plug 52 and circlip 53. The brake valve spool 82 has a pair of lands 57 defining therebetween an annular chamber 58 having a diametral fluid passage 59 formed through the spool 82.

A fixed cross-pin 60 located in the brake valve body passes through the diametral passage 59 and serves to limit movement of the brake spool 82 a spring 61 biasing the spool 82 away from the plug 52 against the cross-pin 60 as previously described.

A double diameter axial bore 83 is formed in the brake spool 82 between the diametral passage 59 and the blind end of the valve bore 81, the smaller diameter portion being adjacent the diametral passage 59.

A piston 84 having flats formed for the passage of fluid is slidable in the brake spool bore 83 and has axial cylindrical extensions 85 and 86 for co-operation with the cross-pin 60 and the blind end of the valve bore 81 respectively.

The larger diameter open end of the brake spool bore 83 is threaded to receive an annular threaded plug 87.

Frusto-conical surfaces 88 and 89 between the piston 84 and its cylindrical extensions 85 and 86 can co-operate respectively with the step in the brake spool bore 83 and the similar step provided by the threaded plug 87 to provide a fluid seal.

In operation the clutch 16 is disengaged and isolated as previously described. Further axial movement of the master cylinder spool 23 causes the pressure in passage 62 to increase, the brake valve spool 82 is moved against the action of the spring 61 and the cylindrical extension 85 co-operates with the cross-pin 60 to lift the frusto-conical surface 88 of the piston 84 from its seat on the step in the brake spool bore 83 to allow pressurised fluid to pass through the diametral passage 59 and port 15 to the clutch brake 17.

If the pressure in the master cylinder is increased still further the brake spool 82 will continue to move against the spring 61 until the seat formed by the threaded plug 87 co-operates with the frusto-conical surface 89 to seal the fluid passage through the plug 87 and so isolate the clutch brake 17.

Thus the fluid pressure applied to operate the brake is limited.

Removal of the axial thrust on the master cylinder spool 23 causes the pressurised fluid operating the clutch 16 and the clutch brake 17 to exhaust as previously described.

Figure 3:
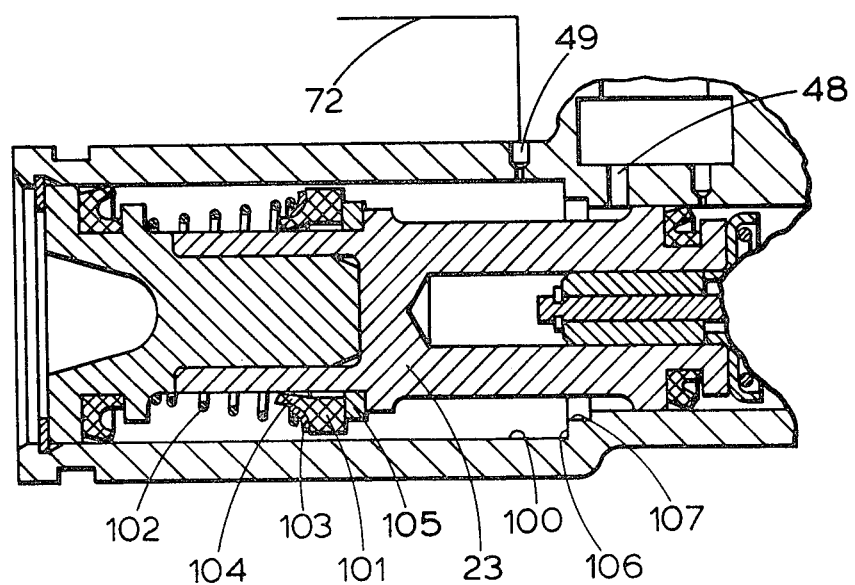
FIG. 3 is a part transverse section through an alternative master cylinder for use with either of the brake valves shown in FIGS. 1 and 2.

The third arrangement, shown in FIG. 3, has provision for fluid pressure feedback on the master cylinder spool 23, and may be used in conjunction with either of the brake valves 12 and 80 previously described.

The master cylinder bore 100 is stepped so that the innermost spool land of the spool 23 runs in a smaller diameter bore than the outermost land. The centre land of the spool 23 is able to pass into the smaller diameter bore portion, and the spool 23 is in two parts sleeved together intermediate the outermost and centre spool lands as previously described.

One relief port 49 is provided opening into the large diameter portion of the bore 100.

An annular seal 101 is urged towards the centre land of the spool 23 by a frusto-conical compression spring 102 acting between a generally 'L' section annular ring 103 backing the seal and the outermost spool land. There is radial clearance between the seal 101 and the bore 100. The seal 101 has a tail 104 for co-operation with the annular ring 103 and is spaced from the centre land by an annular support ring 105.

In operation the clutch is disengaged and isolated as previously described. As the clutch is isolated the annular seal 101 abuts the step 106 in the master cylinder bore 100 and isolates the relief port 49 from the drain port 48. The support ring 105 is accommodated in a bore 107 adjacent the step 106.

Further travel of the master cylinder spool 23 operates the clutch brake and fluid pressure passes from passage 72 through relief port 49 to load the spool 23 against the thrust from the clutch pedal by virtue of the differential area of the master cylinder bore 100, thus a positive increase in clutch pedal effort accompanies operation of the clutch brake.

Release of the clutch pedal causes the pressurised fluid in the clutch and clutch brake to be exhausted in the manner previously described.

We claim:

1. A friction clutch, a friction brake for a drive member driven by the friction clutch and a hydraulic master cylinder assembly, for sequential operation of the clutch and clutch brake under control through the master cylinder, and in which the master cylinder comprises:
    a housing having a bore therein;
    an inlet port to admit fluid to said bore from a fluid reservoir;
    a first outlet port from said bore with means for connection to a hydraulic actuator for said friction clutch;
    a second outlet port from said bore with means for connection to a hydraulic actuator for said friction brake;
    a piston slidable in said bore to control communication between said inlet port and said first and second outlet ports;
    resilient piston return means housed in said bore;
    said first outlet port being open to said friction clutch actuator up to a given first displacement of said piston;
    a closure means carried by said piston for closing said first outlet port at a given first displacement of said piston; and
    valve means responsive to fluid pressure at said first and second outlet ports for effecting communication between said second outlet port and the friction brake actuator above a given second further displacement.

2. The assembly of claim 1, wherein the first outlet port is co-axial with said piston, the closure means carried by said piston being mounted on lost motion means supported by said piston.

3. The assembly of claim 2, wherein said piston has a co-axial blind bore open toward said first outlet port, said lost motion means comprising:
    a plunger slidable in said piston bore and resilient means for urging said plunger outwardly in said piston bore.

4. The assembly of claim 3, wherein said plunger is retained in said blind bore by spring retaining means sandwiched between said piston and said resilient piston return means.

5. The assembly of claim 1, wherein said valve means comprise:
    a valve bore having a valve member slidable therein between first and second given positions, said member being resiliently biased to the first position;
    a resiliently loaded ball valve, co-axially housed in said member and for controlling communication from said second outlet port, said ball valve being resiliently seated at the first position of said valve member; and
    thrust pin means held in operative relationship to said valve member for unseating said ball valve at the second position of said member.

6. The assembly of claim 5, wherein said pin means comprise:
    a pin member passing transversely into a void formed in the valve member, said void forming part of the fluid passage from said second outlet port.

7. The assembly of claim 1, wherein at a given third further displacement of said piston said valve means are operable to isolate said second outlet port from the friction brake actuator.

8. The assembly of claim 7, wherein said valve means comprise:
    a valve bore having a valve member slidable therein between given first, second and third positions, said member being resiliently biased to the first position;
    a resiliently loaded ball valve, co-axially housed in said member and for controlling communication from said second outlet port, said ball valve resiliently seated at the first given position of said valve member; and
    thrust pin means held in operative relationship to said valve member for unseating said ball valve at said second given position and for re-seating said ball valve at said third given position.

9. The assembly of claim 8, wherein said pin means comprise:
    a pin member passing transversely into a void formed in the valve member, said void forming part of the fluid passage from said second outlet port.

* * * * *